US008824377B2

(12) United States Patent
Koskela et al.

(10) Patent No.: US 8,824,377 B2
(45) Date of Patent: Sep. 2, 2014

(54) METHOD OF TRANSMITTING DATA WITHIN A TELECOMMUNICATIONS SYSTEM

(75) Inventors: Jarkko T. Koskela, Oulu (FI); Lars Dalsgaard, Oulu (FI)

(73) Assignee: Nokia Corporation, Espoo (FI)

( * ) Notice: Subject to any disclaimer, the term of this patent is extended or adjusted under 35 U.S.C. 154(b) by 1264 days.

(21) Appl. No.: 12/311,477

(22) PCT Filed: Sep. 18, 2007

(86) PCT No.: PCT/IB2007/002801
§ 371 (c)(1),
(2), (4) Date: Oct. 26, 2009

(87) PCT Pub. No.: WO2008/041078
PCT Pub. Date: Apr. 10, 2008

(65) Prior Publication Data
US 2010/0098002 A1    Apr. 22, 2010

(30) Foreign Application Priority Data
Oct. 2, 2006  (GB) .................................. 0619431.0

(51) Int. Cl.
*H04L 1/18*  (2006.01)

(52) U.S. Cl.
CPC ............ *H04L 1/1887* (2013.01); *H04L 1/1812* (2013.01)
USPC ............................ 370/329; 714/749; 455/522

(58) Field of Classification Search
CPC ....................................................... H04L 1/18
USPC ................. 370/329, 341, 230, 231, 235, 338; 714/748–751; 455/522
See application file for complete search history.

(56) References Cited

U.S. PATENT DOCUMENTS

| 7,818,647 B2 * | 10/2010 | Lohr et al. ..................... 714/750 |
| 8,312,142 B2 * | 11/2012 | Rinne et al. .................... 709/226 |
| 2005/0041618 A1 * | 2/2005 | Wei et al. ....................... 370/328 |

FOREIGN PATENT DOCUMENTS

| CN | 1633676 A | 6/2005 |
| EP | 1 557 967 B1 | 1/2004 |
| EP | 1 821 441 A1 | 8/2007 |
| WO | WO 03/069824 A2 | 8/2003 |
| WO | WO-2006/061911 A1 | 6/2006 |

* cited by examiner

*Primary Examiner* — Christopher Grey
(74) *Attorney, Agent, or Firm* — Harrington & Smith

(57) ABSTRACT

A method of transmitting data within a telecommunications system, wherein scheduling of data transmissions and scheduling of re-transmission data is performed independently.

21 Claims, 3 Drawing Sheets

METHOD OF TRANSMITTING DATA WITHIN A TELECOMMUNICATIONS SYSTEM

FIELD

This disclosure relates to a method of transmitting data within a telecommunications system. The present invention also relates to a telecommunications network, a network entity, and a user equipment adapted to perform said method.

BACKGROUND

Many different telecommunications systems are known in the art. An example of such a system, for illustrative purposes only, is a UMTS network. Referring to FIG. 1, there is illustrated the main elements of a UMTS network. It should be noted that FIG. 1 does not represent a full implementation of a UMTS network, which implementation will be familiar to one skilled in the art. Rather, FIG. 1 represents some of the main elements of such a UMTS network for placing the present invention into an appropriate context.

A user equipment (UE) 100 communicates over a radio interface with a UTRAN (UMTS radio access network) 102. As is known in the art, the UTRAN 102 includes a base transceiver station (BTS) 104 and a radio network controller (RNC) 106. In the UMTS network the UTRAN 102 is connected to a serving GPRS support node (SGSN) 108, which in turn is connected to a gateway GPRS support node (GGSN) 110. The GGSN 110 is further connected to at least one external network, e.g. multimedia IP network, represented by reference numeral 112 in FIG. 1. Both the SGSN and the GGSN may be considered to be network elements. An example of a development of UTRAN is long term evolution (LTE).

There is always a need to improve the performance of telecommunications systems and it is an aim of the present invention to provide a new way of achieving this.

SUMMARY

Data transmissions are sent between the various elements of a telecommunications network using various protocols. Data may be sent periodically/discontinuously according to a particular scheduling procedure with a particular period between transmissions. In telecommunications systems it is known to use the same scheduling procedure for sending new data (or first transmission try), for sending automatic repeat requests when, for example, an error occurs in sending the new data, and for sending the re-transmission data (second or subsequent try). However, the present inventors have realised that this is a very inflexible way of handling data transmissions. Furthermore, it can lead to delays in re-transmitting the data and can lead to undue power consumption within the telecommunications system.

According to an aspect there is provided a method of transmitting data within a telecommunications system, wherein scheduling of data transmissions and scheduling of re-transmission data is performed independently.

The new data transmissions and the re-transmission data may be transmitted at different rates. Preferably, the re-transmission data is sent at a faster rate.

The re-transmission data may comprise one or both of a repeat request sent from a receiver to a sender and retransmitted data corresponding to the previously transmitted data sent from the sender to the receiver.

By performing the scheduling of new data transmissions and the scheduling of re-transmission data independently, a more flexible method for sending data transmissions in a telecommunications network is achieved and delays in re-transmitting data can be avoided.

Furthermore, power consumption can be reduced by allowing a variation in the scheduling of data such that, for example, a shorter re-transmission period can be entered to prevent any delay in the re-transmission of data when required, and then a longer transmission period can be restored after re-transmission is complete. The shorter transmission period may be entered when an error in data reception is detected. Once the data has been correctly received the shorter transmission period no longer applies and a longer transmission period is entered.

Thus, when an error occurs in transmitting or receiving a data transmission being sent from a sender according to a first transmission rate, a repeat request is sent from the receiver back to the sender to resend the data transmission. This repeat request can be sent at a faster transmission rate (shorter transmission interval) than said first transmission rate. Furthermore, the sender can be instructed or arranged to re-send the data transmission to the receiver at a faster rate than said first transmission rate.

Systems can be set up with an adequate transmission rate for the situation where there are no errors in data transmission or reception. However, in order to avoid large delays when there is an error in data transmission or reception, the system can switch into a faster transmission mode in order to reduce delays. Of course, an alternative would be to run the system such that all transmissions are sent at a faster rate. However, this uses a large amount of power which is undesirable, particularly when using mobile user equipment. By de-coupling the transmission rates for normal data and re-transmission data a higher performance yet power saving system can be attained.

The transmission schedule for the re-transmission data can be set dependent on the type of error that occurred on transmission or reception of the new data, the type of data, according to a priority setting associated with the data, or according to a mode of operation set for the system. For example, for important messages, the system could be arranged such that a higher rate of re-transmission is set in order to ensure that if there is an error in sending or receiving the data then the data is re-sent quickly.

According to one embodiment, when the shorter re-transmission period is entered to prevent any delay in the re-transmission of data, it is not required that normal/new data transmissions are set to the same period. It can be advantageous to continue transmitting normal/new data on a longer cycle time while performing re-transmissions on a shorter cycle time. This allows for a good balance to be achieved between system performance and power consumption.

In one arrangement the new/normal transmissions are sent in discontinuous reception (DRX) mode. Requests for re-transmission may be sent in hybrid automatic request repeat (HARQ) mode. The transmission may be implemented in a long term evolution (LTE) system also known as E-UTRAN.

In accordance with an embodiment, the HARQ retransmission interval can be set at a different, and preferably shorter, length when compared to the new data DRX transmission interval to prevent delays in HARQ re-transmissions. At the same time, it is not required to reduce the DRX transmission period (in conjunction with the HARQ transmission period) as this would lead to an increase in the rate of both DRX and HARQ transmissions leading to a higher power consumption.

According to another aspect there is provided a network element adapted to perform the method described herein.

According to another aspect there is provided user equipment adapted to perform the method described herein. The user equipment may be a mobile user equipment.

According to another aspect there is provided a telecommunications network comprising the network element and a plurality of mobile user equipment.

According to another aspect there is provided a computer program comprising program code means adapted to perform the method described herein when the program is run on a computer or on a processor.

According to another aspect there is provided a computer program product comprising program code means stored in a computer readable medium, the program code means being adapted to perform any of steps of method described herein when the program is run on a computer or on a processor.

BRIEF DESCRIPTION OF THE FIGURES

For a better understanding of the invention and to show how the same may be carried into effect, embodiments of the invention will now be described by way of example only with reference to the accompanying drawings, in which.

DESCRIPTION OF CERTAIN EMBODIMENTS

It will be understood that in the following description is described with reference to particular non-limiting examples from which the invention can be best understood. The invention, however, is not limited to such examples.

Embodiments can be implemented in the UTRAN evolution named LTE. In particular, an embodiment concerns DRX behaviour in connection with HARQ signalling and retransmissions.

A non-limiting example of mobile architectures whereto the present principles may be applied is known as the Evolved Universal Terrestrial Radio Access (E-UTRA). An exemplifying implementation is therefore now described in the framework of an Evolved Universal Mobile Telecommunication System (UMTS) Terrestrial Radio Access Network (E-UTRAN). An Evolved Universal Terrestrial Radio Access Network (E-UTRAN) consists of E-UTRAN Node Bs (eNBs) which are configured to provide both base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices. It is noted, however, that the E-UTRAN is only given as an example and that the method can be embodied in any access system or combination of access systems where retransmission data is required.

Figure 1:
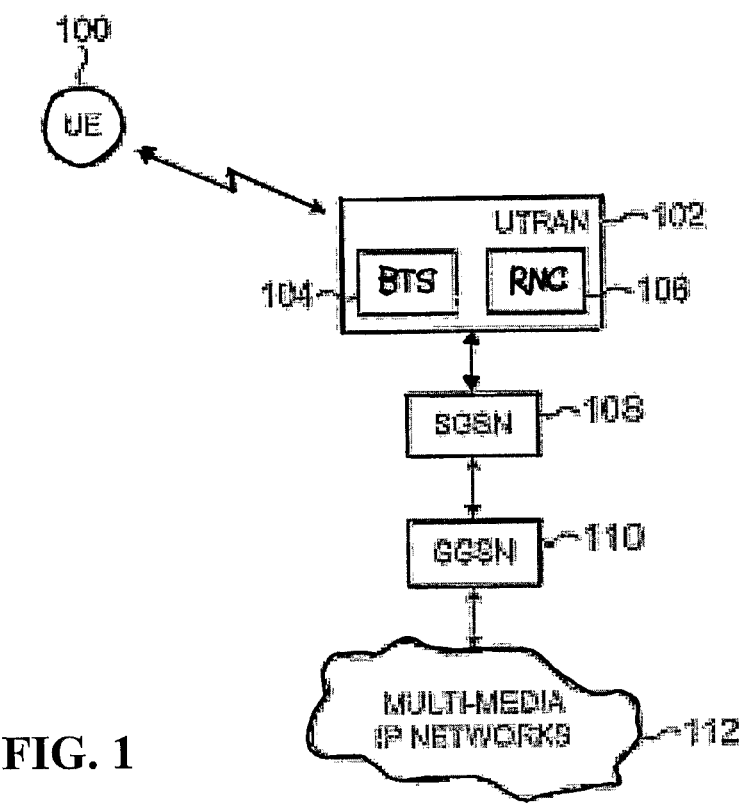
FIG. 1 illustrates the main elements of a UMTS network.
Figure 2:
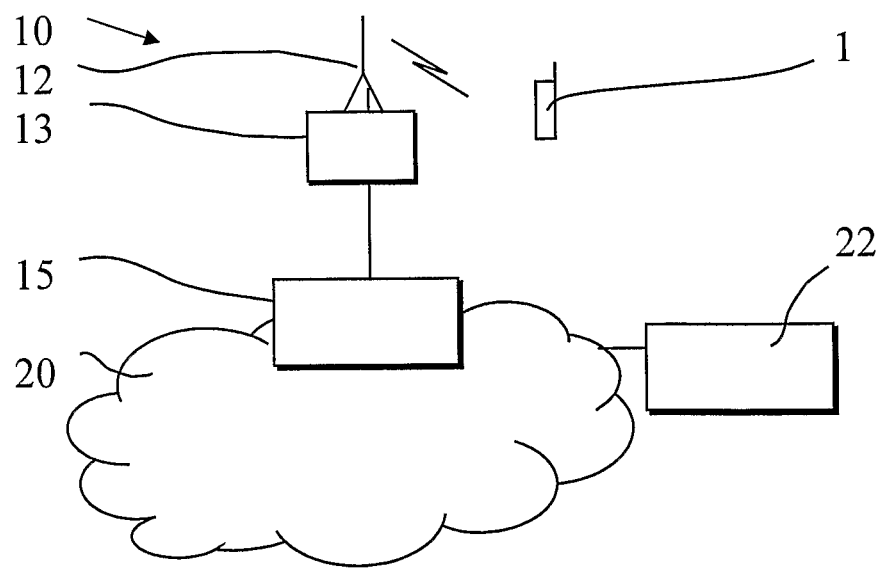
FIG. 2 illustrates the main elements of a EUTRAN network.

A communication device can be used for accessing various services and/or applications provided via a communication system as shown in FIG. 2. In wireless or mobile systems the access is provided via an access interface between a mobile communication device 1 and an appropriate wireless access system 10. A mobile device 1 can typically access wirelessly a communication system via at least one base station 12 or similar wireless transmitter and/or receiver node. Non-limiting examples of appropriate access nodes are a base station of a cellular system and a base station of a wireless local area network (WLAN). Each mobile device may have one or more radio channels open at the same time and may receive signals from more than one base station.

A base station is typically controlled by at least one appropriate controller entity 13 so as to enable operation thereof and management of mobile devices in communication with the base station. The controller entity is typically provided with memory capacity and at least one data processor. In FIG. 2 the base station node 12 is connected to a data network 20 via an appropriate gateway 15. A gateway function between the access system and another network such as a packet data network may be provided by means of any appropriate gateway node, for example a packet data gateway and/or an access gateway.

Furthermore, FIG. 2 shows a point-to-multipoint service node 22 which is connected to the data network 20. In the example of FIG. 2 communications between the mobile device 1 and the broadcast multicast services node 22 are routed via the data network 20, the gateway 15 and the base station system 12 and 13.

The point-to-multipoint service node 22 may be configured to provide content delivery functions for Multimedia Broadcast/Multicast Service (MBMS) or similar. The service node 22 may be provided by a server which is configured to broadcast or multicast information to multiple participants over a geographical area. The service node 22 may serve as an entry point for transmissions of a content provider providing broadcast or multicast data to communication devices situated in a geographical area served by the service node 22.

In LTE, active mode DRX functionality is seen as one of the primary tools in order to make LTE active mode UE power consumption friendly. The aim in LTE is that the UEs in LTE_ACTIVE should be able to support several different lengths of DRX periods. Variations in DRX period length may be something between non-DRX (1TTI) to several seconds (current thinking is 5.12 seconds, but generally there is no theoretical upper limit). This kind of flexibility in active mode DRX allows for good power saving capabilities on the UE side. The network/eNB may assign any suitable DRX interval and customise applicable DRX periods for different services. In LTE the main idea is that the UE is scheduled with UL/DL (uplink/downlink) resources through downlink AT/DSCCH/PDSCCH (Allocation Table/Downlink Shared Control Channel/Physical DSCCH), which is received once per DRX interval at DRX timeout.

On the other hand LTE also supports HARQ procedure, and traditionally scheduling of HARQ re-transmissions has been tightly coupled with the scheduling of new data. Thus, in LTE, if the DRX period lasts, for example, 1 s (due to needs for scheduling of new data), scheduling of HARQ re-transmissions would be using the same scheduling DRX as normal data transmission, i.e. a 1 s period. HARQ re-transmissions would thus be delayed quite heavily. Alternatively, the DRX interval for scheduling of all data could be assigned in order to assure less delay in the scheduling of HARQ re-transmissions. However, decreasing the scheduling DRX interval in general leads to higher UE power consumption. Embodiments of the present invention provide a solution to circumvent these problems.

In embodiments of the present invention the DRX procedure used for new data scheduling (or first transmission try scheduling) is generally independent from the HARQ re-transmission procedure and the scheduling for the re-transmission data. This means that the scheduling DRX for HARQ re-transmissions/signalling is not limited to using the DRX interval used for scheduling of normal/new data transmissions (from now on called as normal DRX). This generally means that scheduling for new data and scheduling for HARQ re-transmission data is performed independently of each other.

Implementation is quite simple. It just needs to be standardized that HARQ scheduling DRX (points where UE needs to read L1/L2 signalling channel) is (or may be) independently defined from scheduling of normal or new data transmission DRX.

Thus, at a general level scheduling for new data and scheduling for HARQ re-transmission data is performed independently of each other. In the particular embodiment described here, HARQ scheduling DRX (points where UE needs to read L1/L2 signalling channel) is (or can be if required) independently defined from scheduling of normal or new data transmission DRX.

Future cellular, and potentially other, wireless systems that use a combination of DRX and ARQ can utilize the embodiment described here. Terminals and base stations (or any other network element taking care of scheduling of re-transmissions) would be affected. Embodiments of the present invention provide better terminal power saving without loss in latency.

In the case of VoIP (voice over IP), or any other service that produces data with uniform intervals, embodiments of the present invention provide the capability for transmissions to continue on a longer cycle (20 ms in the case of VoIP), while performing re-transmissions on a shorter cycle. For example, the shorter DRX loop may be entered if the UE detects an error in the data reception (and therefore provides an NAK (negative acknowledgement) to the network). Once said data is correctly received (no NAK to the network), the shorter DRX no longer applies. The longer DRX, as specified in FIGS. 3 and 4 and discussed below, remains unchanged throughout the whole procedure. In one arrangement, only errors in downlink transmissions trigger shorter DRX for re-transmissions.

According to one arrangement, it can be standardized that HARQ scheduling DRX (points where UE needs to read L1/L2 signalling channel) is (or may be) independently defined from scheduling of normal or new data transmission DRX. It should be noted that the present invention does not rule out possibility that normal DRX scheduling is the same as HARQ DRX, e.g. for very high data throughput scenarios where HARQ DRX and new data DRX may be overlapping.

Reasons for handling scheduling of I-IARQ re-transmissions outside normal DRX scheduling include:
1. Using regular DRX scheduling also for scheduling HARQ re-transmissions may result in the HARQ re-transmissions being unnecessary delayed, e.g. due to the long regular DRX interval.
2. Using regular DRX scheduling also for scheduling HARQ re-transmissions could, in many situations, put a limit on, or decrease, the possible length of the regular DRX interval.
3. Changing of normal DRX (for HARQ purposes) to short periods could cause too much signalling in the air interface, e.g. DRX of is interval is used then the network wants to send a transmission and it needs to change the DRX period in order to make HARQ work effectively. This will introduce lots of signalling.
4. A change in normal DRX signaling may cause serious problems if the initial assignment of DRX parameters fails and therefore would need HARQ re-transmissions.

Arrangements could easily be supported by specifying a specific HARQ re-transmission DRX pattern to be used in different cases.

The eNB could inform the UE during connection setup which HARQ re-transmission DRX is to be applied in a specific case.

It could be distributed in system information in the cell which HARQ re-transmission DRX to apply. This could be useful in the case that all HARQ DRX scheduling in the cell is done similarly independent of connection type or requirements.

Also it could be given directly in the specifications which HARQ scheduling DRX to apply in specific situations.

Arrangements according to embodiments may have several advantages over known systems. For example, decoupling normal DRX and HARQ may enable DRX to be handled by less signalling. The arrangement can be more Flexible than normal DRX handling. Easier standardization work may be provided as it is quicker to standardize a DRX scheme. Possibility of using longer DRX periods may be enabled, which cam be used to improve UE power consumption without delaying possible HARQ re-transmissions. The arrangement does not interfere with current HARQ functionality.

Figure 3:
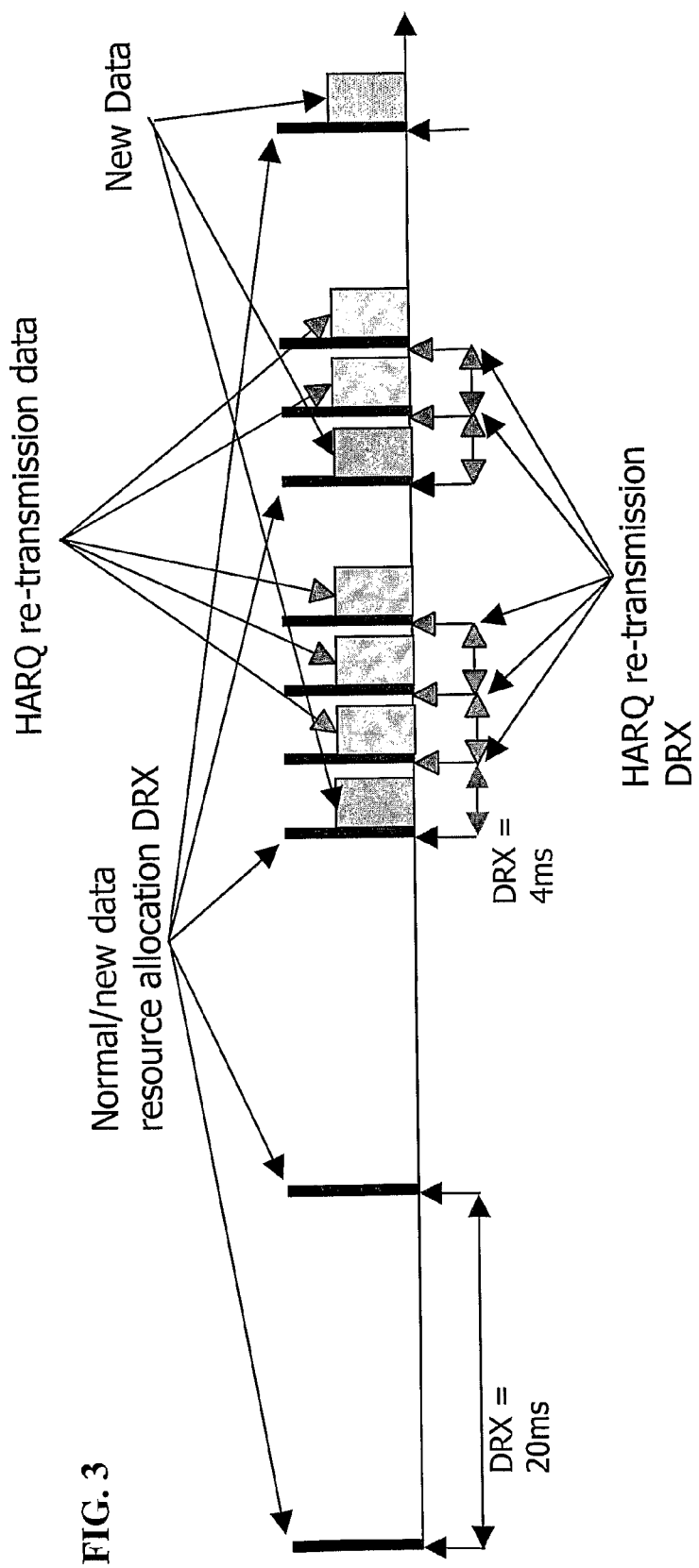
FIG. 3 illustrates the scheduling of normal DRX and HARQ DRX according to an embodiment.

FIG. 3 illustrates the scheduling of normal DRX and HARQ DRX according to an embodiment of the present invention. DRX used for scheduling of normal/new data is 20 ms. Possible HARQ re-transmissions are scheduled with a shorter DRX which is 4 ms. This scheduling could, for example, illustrate VoIP transmission. In the case where the scheduling of new data and HARQ re-transmissions would have to be done using same DRX interval, the scheduling of the HARQ re-transmissions would lower the upper limit for the DRX used for scheduling of new data. This would lead to increased UE power consumptions in the cases where there would not be a need to use a full set of HARQ re-transmissions.

Figure 4:
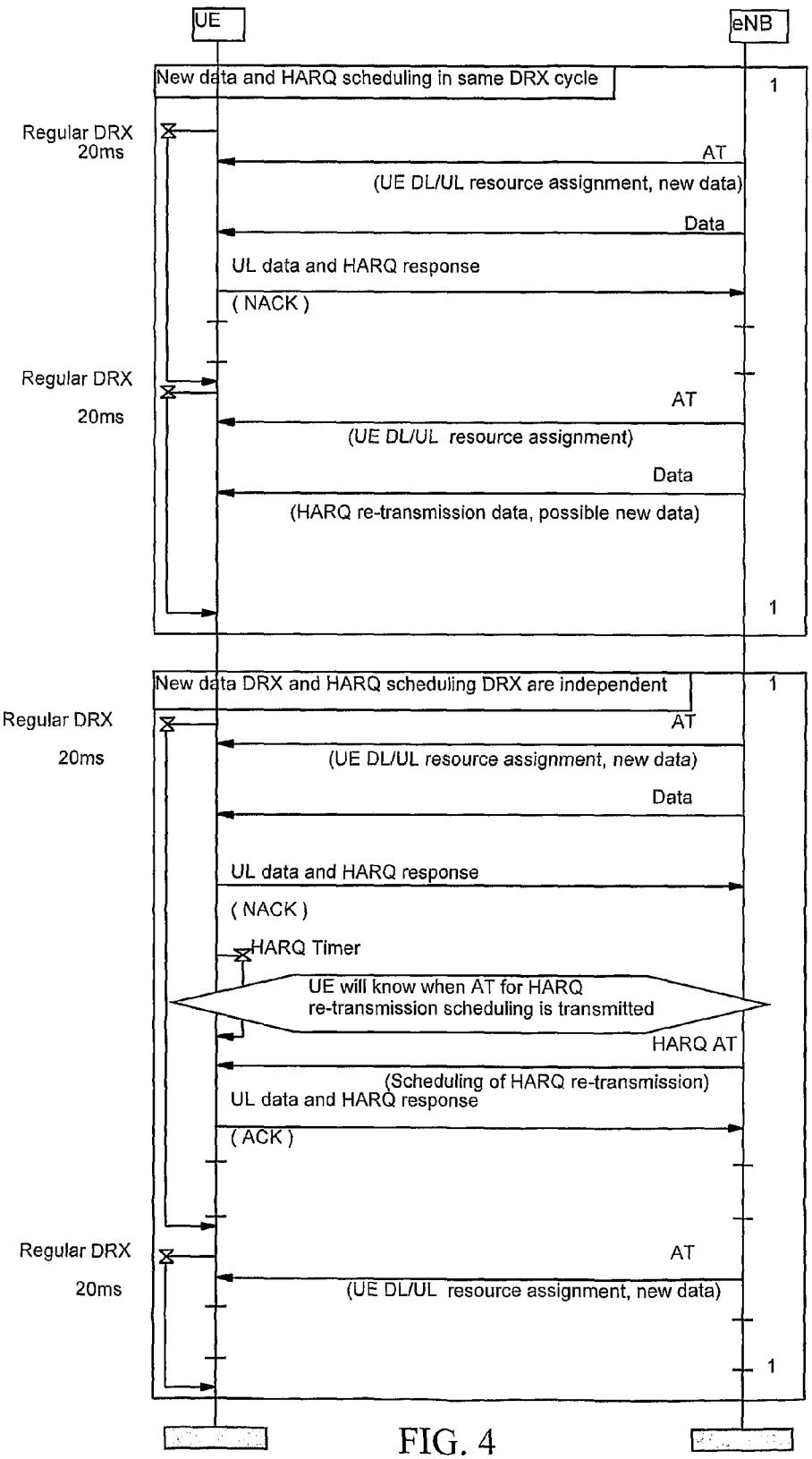
FIG. 4 illustrates a message sequence chart for implementing the type of scheduling illustrated in FIG. 3.

FIG. 4 illustrates a message sequence chart for scheduling DRX for new and re-transmitted data using the same or independent DRX.

The required data processing functions may be provided by means of one or more data processor entities. All required processing may be provided in the mobile user equipment or a network element such as the base station transceiver/Node B or equivalent. Appropriately adapted computer program code product may be used for implementing the embodiments, when loaded to a computer or processor. The program code product for providing the operation may be stored on and provided by means of a carrier medium such as a carrier disc, card or tape. A possibility is to download the program code product via a data network. Implementation may be provided with appropriate software.

While this invention has been particularly shown and described with reference to preferred embodiments, it will be understood to those skilled in the art that various changes in form and detail may be made without departing from the scope of the invention as defined by the appendant claims.

The invention claimed is:

1. A method comprising:
scheduling of data transmissions in discontinuous reception (DRX) mode for transmission within a telecommunications system;
scheduling of re-transmission data in discontinuous reception (DRX) mode independently of the scheduling of data transmissions;
sending the data transmissions in discontinuous reception (DRX) mode; and sending the re-transmission data in hybrid automatic request repeat (HARQ) mode,
wherein the re-transmission data is transmitted with a shorter transmission interval than the data transmissions.

2. The method according to claim 1, wherein the re-transmission data comprises one or both of a repeat request sent from a receiver to a sender and retransmitted data sent from the sender to the receiver.

3. The method according to claim 2, further comprising:
detecting an error in a received data transmission; and
transmitting the repeat request from the receiver back to the sender to resend the data transmission, the repeat request being sent with a different transmission interval than the data transmission.

4. The method according to claim 2, wherein the retransmitted data sent from the sender to the receiver has a different transmission interval than the data transmission.

5. The method according to claim 1, further comprising:
setting the scheduling of re-transmission data according to one or more of: the type of error that occurred on transmission or reception of the data transmission; the type of data transmission; a priority setting associated with the data transmission; and a mode of operation set for the communications system or a part thereof.

6. The method according to claim 1, further comprising:
sending the re-transmission data with a different transmission interval than the transmission data, the scheduling of new transmission data remaining unchanged.

7. An apparatus comprising:
at least one processor, and at least one memory including computer program code, wherein the at least one memory and the computer program code are configured, with the at least one processor, to schedule data transmissions in discontinuous reception (DRX) mode for transmission within a telecommunications system, schedule re-transmission data in discontinuous reception (DRX) mode independently of the scheduling of data transmissions, send the data transmissions in discontinuous reception (DRX) mode and send the re-transmission data in hybrid automatic request repeat (HARD) mode, the re-transmission data being scheduled for transmission with a shorter transmission interval than the data transmissions.

8. The apparatus according to claim 7, wherein the apparatus is configured to process re-transmission data which comprises one or both of a repeat request sent from a receiver to a sender and retransmitted data sent from the sender to the receiver.

9. The apparatus according to claim 8, the apparatus being further configured to detect an error in a received data transmission and transmit the repeat request from the receiver back to the sender to resend the data transmission, the repeat request being sent with a different transmission interval than the data transmission.

10. The apparatus according to claim 8, the apparatus being further configured to send the retransmitted data from the sender to the receiver with a different transmission interval than the data transmission.

11. The apparatus according to claim 7, the apparatus being further configured to set the scheduling of re-transmission data according to one or more of: the type of error that occurred on transmission or reception of the data transmission; the type of data transmission; a priority setting associated with the data transmission; and a mode of operation set for the communications system or a part thereof.

12. The apparatus according to claim 7, the apparatus being further configured to send the re-transmission data with a different transmission interval than the transmission data, the scheduling of new transmission data remaining unchanged.

13. The apparatus according to claim 7, wherein the apparatus is a network element.

14. The apparatus according to claim 7, wherein the apparatus is a mobile user equipment.

15. The apparatus according to claim 7, wherein the apparatus is a telecommunications network.

16. A non-transitory computer readable storage medium comprising program code, the program code being configured to perform a method comprising:
scheduling of data transmissions in discontinuous reception (DRX) mode for transmission within a telecommunications system;
scheduling of re-transmission data in discontinuous reception (DRX) mode independently of the scheduling of data transmissions;
sending the data transmissions in discontinuous reception (DRX) mode; and
sending the re-transmission data in hybrid automatic request repeat (HAW) mode,
wherein the re-transmission data is scheduled for transmission with a shorter transmission interval than the data transmissions.

17. The non-transitory computer readable storage medium according to claim 16, the program code being configured to process re-transmission data comprising one or both of a repeat request sent from a receiver to a sender and retransmitted data sent from the sender to the receiver.

18. The non-transitory computer readable storage medium according to claim 17, the program code being configured to detect an error in a received data transmission and transmit the repeat request from the receiver back to the sender to resend the data transmission, the repeat request being sent with a different transmission interval than the data transmission.

19. The non-transitory computer readable storage medium according to claim 18, the program code being configured to send the retransmitted data from the sender to the receiver with a different transmission interval than the data transmission.

20. The non-transitory computer readable storage medium according to claim 16, the program code being configured to set the scheduling of re-transmission data according to one or more of: the type of error that occurred on transmission or reception of the data transmission; the type of data transmission; a priority setting associated with the data transmission; and a mode of operation set for the communications system or a part thereof.

21. The non-transitory computer readable storage medium according to claim 16, the program code being configured to send the re-transmission data with a different transmission interval than the transmission data, the scheduling of new transmission data remaining unchanged.

* * * * *

UNITED STATES PATENT AND TRADEMARK OFFICE
CERTIFICATE OF CORRECTION

| | |
|---|---|
| PATENT NO. | : 8,824,377 B2 |
| APPLICATION NO. | : 12/311477 |
| DATED | : September 2, 2014 |
| INVENTOR(S) | : Koskela et al. |

It is certified that error appears in the above-identified patent and that said Letters Patent is hereby corrected as shown below:

In the Claims

Claim 7, col. 7, line 42 "(HARD)" should be deleted and --(HARQ)-- should be inserted.

Claim 16, col. 8, line 27 "(HAW)" should be deleted and --(HARQ)-- should be inserted.

Signed and Sealed this
Eighteenth Day of November, 2014

Michelle K. Lee
*Deputy Director of the United States Patent and Trademark Office*